United States Patent [19]

Roldán

[11] Patent Number: 5,796,627

[45] Date of Patent: Aug. 18, 1998

[54] ACTUATING AND DUAL SCANNING INTEGRATED CIRCUIT

[75] Inventor: Luis Pérez Roldán, Madrid, Spain

[73] Assignee: Telefonica De España, S.A., Madrid, Spain

[21] Appl. No.: 423,155

[22] Filed: Apr. 17, 1995

[30] Foreign Application Priority Data

May 20, 1994 [ES] Spain ................................. 9401116

[51] Int. Cl.⁶ .................................................. H02M 3/07
[52] U.S. Cl. ............................ 364/492; 363/26; 323/901
[58] Field of Search ........................ 364/492, 551.01, 364/570; 341/110; 379/400; 363/16, 98, 132, 26, 21; 323/902

[56] References Cited

U.S. PATENT DOCUMENTS

| | | | |
|---|---|---|---|
| 4,449,173 | 5/1984 | Nishino | 363/21 |
| 5,208,738 | 5/1993 | Jain | 363/17 |
| 5,532,913 | 7/1996 | Suzuki et al. | 363/25 |

*Primary Examiner*—James P. Trammell
*Assistant Examiner*—Kamini S. Shah
*Attorney, Agent, or Firm*—Reid & Priest LLP

[57] ABSTRACT

In an actuating and dual scanning integrated circuit, modulators 24 of respective programmable power regulators 11 transmit to respective power converters, energy transfer commands corresponding to programming performed in the circuit. Modulation of the modulators' output signals depends on the programming and on feedback received from output sites 7 that it controls. The circuit communicates through a series link with a main control system 28 so that the control system varies the circuit's programming and receives data corresponding to circuit performance.

5 Claims, 2 Drawing Sheets

ACTUATING AND DUAL SCANNING INTEGRATED CIRCUIT

BACKGROUND OF THE INVENTION

The present invention relates to an actuating and dual scanning integrated circuit, which is specifically designed to simultaneously control two dual quadrant DC/DC converters acting as a programmable current and voltage switches sources, their operation being based on a width modulation of pulses they transmit to the power steps of converters.

The control of said modulation depends both on the diverse parameters to be configured by programming, and the feedback signals received by the actuating and scanning circuit from the output-sites of converter, the integrated circuit of a hybrid circuit forming a part as an actuating and scanning site, controlling the elements this site has to act on the outputs belonging to electronic registers of electromechanical telephone stations being the bonding link between digital systems connected to this station and the station itself.

It is to be pointed out that the actuating and scanning integrated circuit can read the signal levels of the most important parameters of the converter, filter them and deliver their value to the main control system, with which it communicates by a series link of two wires.

FIELD OF THE INVENTION

This invention applies to the telecommunications field, forming particularly a part of electronic registers of electromechanical telephone stations, in order to allow these stations to be connected with digital systems.

RELATED ART

The elements really performing marking tasks in electromechanical stations include a complex variety of circuital situations on the interface with the subscriber lines, making it practically impossible, in these systems, to carry out modifications redounding to a better management of recourses or to a satisfactory service quality.

Furthermore, these systems include bulky elements and require cumbersome operating tasks and maintenance. Also, they are not accessed by subscribers with a multifrequency signaling, neither through other type of digital systems.

The solutions posed with semiconductor switches find problems in relation to difficulties in protecting them against overvoltages and overcharges. The semiconductor switches require a large space, and their eficiency is very small, since, generally, they must be overdimensioned to act under the anticipated terms, all this with a high cost, both in consumption and in physical space, as well the great amount of dissipated power for working within adequate temperature ranges.

In front of all above-mentioned problems, a solution would be to provide the electromechanical systems on the interface with digital systems, having a structure that, being composed of a universal circuit, easily programmable for all circuit features to intervene in, would obtain a substantial reduction of size and number of elements to be installed, and working under appropiate conditions with regard to the levels of energy consumption and power dissipation, with adequate guarantees in relation to the protections of said circuit.

Nevertheless, until now nothing is known about the existence of an invention fitted with the feaures as pointed out as suitable.

SUMMARY OF THE INVENTION

The actuating and dual scanning integrated circuit as proposed by the invention, constitutes an evident solution to the above-mentioned problems, since it relies on a series of features which are appropiated to solve said drawbacks.

In a most evident way, the actuating and dual scanning circuit of the invention is configured as an analog-digital device, the function of which is to perform a control of two DC/DC converters by means of a width modulation of pulses based on the external programming it receives.

The actuating and dual scanning integrated circuit consists of a sole control portion and two programmable and identical power regulators.

Each programmable power regulator (RPP) takes on the task of controlling a power unit belonging to DC/DC converter on which it acts.

The actuating and dual scanning circuit collects the information of both power units and sends the corresponding control signals to these units.

These power units support the physical interface with an electronic register of the telephone station, so allowing to scan the voltage and current in the station wires, as well as to act on them, generating the desired voltage and current every moment thru said wires.

Therefore, each actuating and scanning circuit will allow scanning and acting on both points of the station to which the corresponding hybrid circuit is connected, in which it will be included.

The actuating and dual scanning integrated circuit will be controlled by the corresponding software processing unit, to which it is connected through two series communication lines, one for receiving commands, and one for sending answers.

To this end, there is an element the function of which is to perform an interface between the software processing unit and the actuating and scanning integrated circuit, which will be en interface block with the software processing unit (IDCP).

The actuating and dual scanning integrated circuit is composed of the following functional blocks Analog block.

Reset and clock signal generator.

Programmable power regulators.

Micro interface.

Digital filter.

Basically, the actuating and scanning integrated circuit implements two pulse width modulars, where the width thereof is controlled by values taken, every moment, by the input analog signals, as well as by diverse externally programmable paramemeters configuring their mode of operation.

The analog block handles all analog signals utilized by the circuit, so that the rest of the blocks handle only digital signals, and have three differentiated blocks, namely:

A/D converter block.

D/A converter block.

Error signal generating block.

In the A/D converter block, a sampling of the analog signals entering the actuating and scanning integrated circuit is performed, and samples of each signal pass then to the digital filtering block, in which, once they have been processed, are stored in read registers.

In the D/A converter block, a digital to analog conversion of values of voltages and currents programmed in the programmable power regulator is performed.

This block is composed of converters, the analog outputs of which will pass to the error signal generating block.

The error signal generating block is composed of comparators at which the signals of the D/A converter block arrive, in addition to a reference signal internally generated in the actuating and scanning integrated circuit.

To these comparators, suitable logic gates are associated, these gates being designed for generating overcurrent signals or for loading, in corresponding registers, the error signals to be sent to the control block of the power regulators.

The reset and clock generation block is designed for decoding the external reset signal, after which, it will enable the corresponding clock generators, which will mark the several frequencies for sampling both the working cycle and signal.

The programmable power regulators control, each of them, an output site within a hybrid circuit as an actuating and scanning point, and each block performs, on the point controlled by it, the following functions, namely:

- To carry out an energy transfer between the primary and secondary windings of the transformer of the DC/DC converter block in the hybrid circuit power unit as an actuating and scanning point.
- To control the amount of energy transferred among windings of said transformer.
- To change the sense of the transferred energy, in accordance with the function indicated in the programming.
- To control the different blocks composing it.
- To carry out the first three tasks, a pulse width modulator has been provided, the function of which is to generate the output signals of the programmable power regulator, which are necessary for controlling the DC/DC block transistors of the corresponding power unit.

This modulator block is basically controlled by a generated clock signal indicating the working cycle of the circuit, with which all power regulator operations are based on the period of the clock The programmable power regulator includes a decoder for input signals, performing the processing thereof and generating a signal showing the sense in which the energy transfer is to be made in the power unit.

There is a general control for the elements of the programmable power regulator, timing the tasks to be performed by it, and this controller reads the states in which both the decoder and modulator are found, and, based on external control signals, arranges the operations to be carried out.

The interface of the micro receives and encodes the data arriving in the actuating and scanning integrated circuit over an input series line, and it manages also the answers and encodes them.

The interface of the micro can distinguish the correct commands and rejects the incorrect commands, by controlling the data inputs, and it has a battery of dual registers wherein it stores the programming of the programmable power regulators.

The digital filtering block performs a filtering of the samples of the input analog signals which are used in the read commands.

The sampling is permanently performed, and the signals it receives refer to the voltage and current values of the point controlled by the programmable power regulator.

Furthermore, in the digital filtering block, a control of analog multiplexors and of the analog-digital conversion step is performed.

BRIEF DESCRIPTION OF THE DRAWINGS

In order to complement this description and to aid understanding of the features of the invention, the accompaying drawings, which are a part of this specification, show in an illustrative but non limitative sense, the following.

DETAILED DESCRIPTION OF THE PREFERRED EMBODIMENT

Having as a premise the fact that the actuating and dual scanning of the invention answers the idea of an analog-digital device, the function of which is to control two DC/DC converters by pulse width modulation, based on the external programming it receives.

Figure 1:
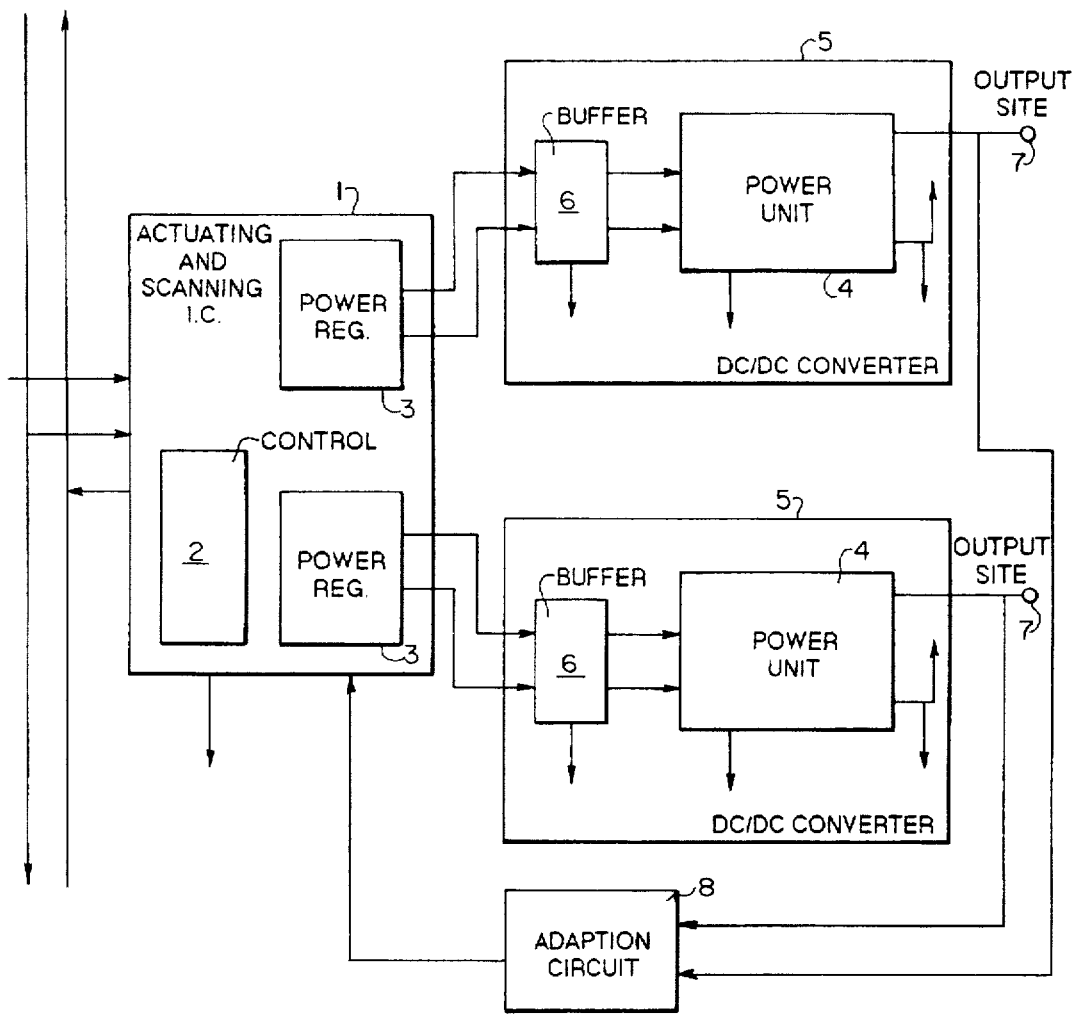
FIG. 1 shows a block diagram of the hybrid circuit wherein the actuating and dual scannning integrated circuit is housed, and showing also the elements connected to it and controlled by it.

Following FIG. 1, it can be seen a diagram of a hybrid circuit as an actuating and scanning point in which an actuating and dual scanning integrated circuit (1) is incorporated, consisting of a sole control part (2) and two identical and programmable power regulators (3).

Each of programmable power regulators (3) takes on the task of a power unit (4) belonging to the DC/DC converter (5), on which it acts, by acceding same through buffers (6).

The actuating and scanning integrated circuit (1) picks up the information from the two power units (4), and from the output sites (7) on which they act and belonging to the register of the telephone station.

The information is picked up by an adaptation circuit (8), which delivers it to the actuating and scanning integrated circuit (1) to proceed it properly.

Figure 2:
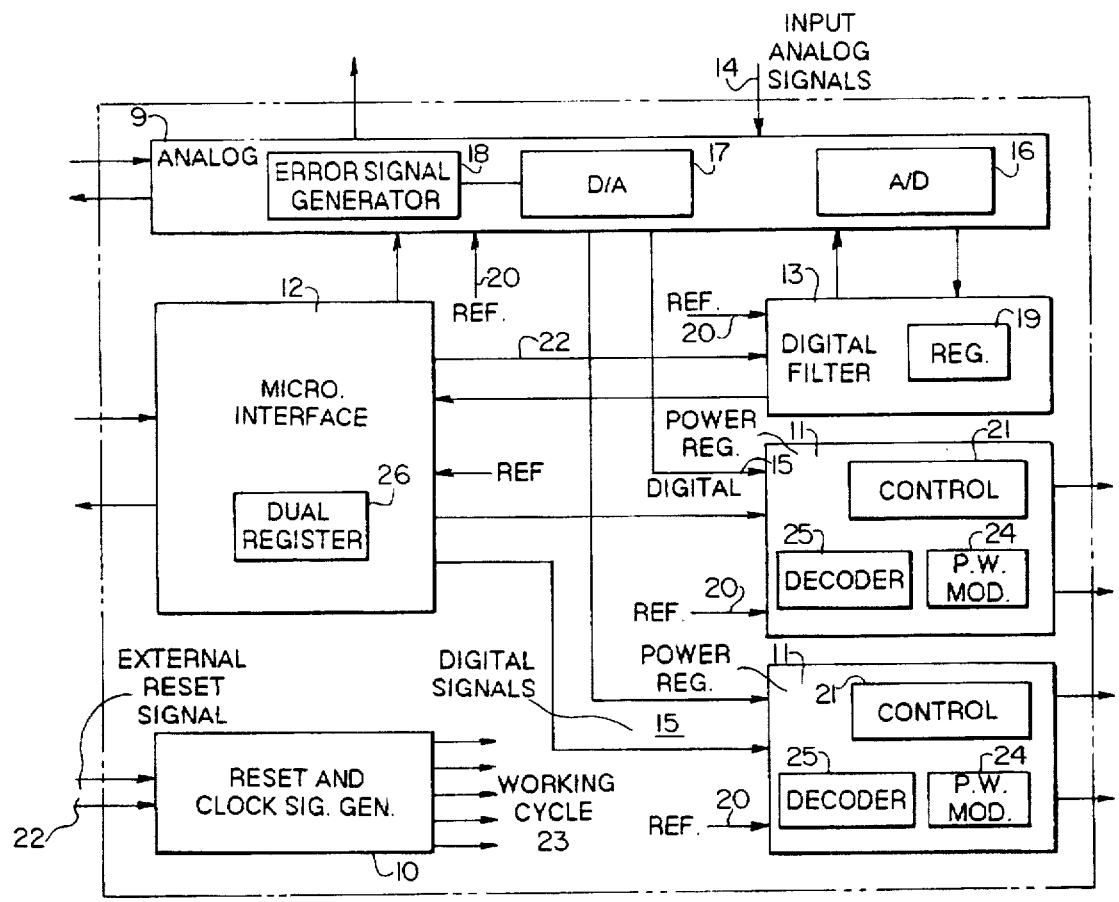
FIG. 2 shows a block diagram composing the actuating and dual scanning integrated circuit of the invention.

The actuating and scanning integrated circuit, as can be seen by following FIG. 2, is composed of the following functional blocks:

Analog block (9).

Reset and clock signal generator (10).

Programmable power regulators (11).

Micro interface (12).

Digital filtering unit (13).

Basically, the actuating and scanning integrated circuit implements two pulse width modulators (24), included in the programmable power regulators (11), controlling the pulse width in accordance with the values that, every moment, are taken by the input analog signals (14), as well as several externally programmable parameters configuring their mode on operation.

The analog block (9) receives the analog signals (14) and processes them, so that the rest of units receives only digital signals (15).

The analog block (9) contains three functional blocks, namely:

An A/D converter block (16).

A D/A converter block (17).

An error signal generating block (18).

In the conversion block or A/D converter block (16), a sampling of the input analog signals (14) entering the actuating and scanning integrated circuit is performed.

The samples of each of these signals, once they have been processed and digitized, pass to the digital filtering block (13), wherein are stored in read registers (19), to be later used.

In the D/A conversion block (17), a conversion of signal of digital to analog type is performed.

These signals, converted from digital type to analog type, do correspond to the values of voltages and currents corresponding to the actuating point and produced, in accordance with the programming, as an answer to the signals sent by the programmable power regulator (11).

This block is formed by four converters, the analog output of which will pass to the error signal generating block (18).

The error signal generating block (18) is composed of twelve comparators at which the D/A conversion block signals arrive, in addition to a reference signal (20), internally generated in the actuating and scanning integrated circuit.

To these comparators are associated the appropiate logic gates to generate overcurrent signals, as well as for loading, in corresponding registers, the error signals to be sent to the control block (21) of the programmable power regulators (11).

The function of the reset and clock generator block (10) is to decode the external reset signal (22), with which, once this has been performed, it will proceed to enable the corresponding clock generators, which will indicate the several frequencies for sampling both the signal and working cycle (23).

Each of the pulse width regulators (11) has a pulse width modulators (24), an input signal decoder (25) and a general control unit (21).

The function of the pulse width modulator (24) is to generate the output signals of the regulator (11), and these signals—perform the energy transfer control among the DC/DC converter (5) components, as seen in FIG. 1.

At the pulse width modulator (24) arrives the clock signal generated in the clock generation block (10), which indicates the working cycle, the signal generating the decoder (25) showing the sense of the energy transfer, and the general control units (21) of the programmable power regulator (11), which arranges the tasks to be performed according to the read it performs about the states in which the rest of modules of the programmable power regulator (11) and external control signals are found.

At the interface of the micro (12) arrive the programming data and the actuation commands over an input series line, this block managing and ending answers to these commands, distinguishing the correct ones and rejecting the incorrect ones. The interface of the micro (12) includes a dual register (26) wherein it stores the programming of the programmable power regulators (11)

The digital filtering block (13) filters the input analog signal samples (14), sampling the signal in a permanent way.

The signals received by the digital filtering block (13) refer to the voltage and current values of the point controlled by the programmable power regulator (11).

The digital filtering block (13) controls based on analog multiplexors 16 and for the analog-digital conversion step (17).

Figure 3:
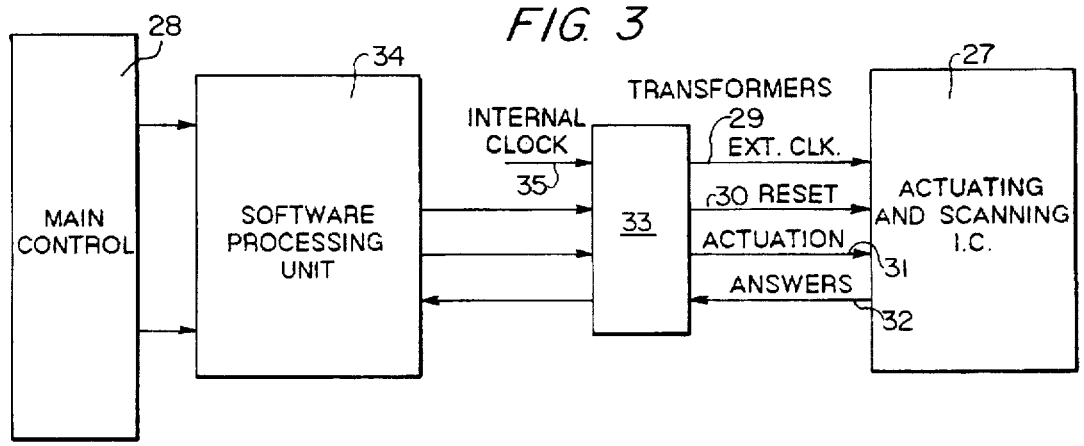
FIG. 3 shows, lastly, a detail of the interface of the actuating and dual scanning integrated circuit with the software processing unit.

Following FIG. 3, it can be seen a detail of the actuating and scanning integrated circuit (27) with a software processing sing unit (34), with the external clock signals (29), the reset signal (30) and the actuation commands (31) arriving at the actuating and scanning integrated circuit (27), while this emits the answers (32) corresponding to said commands.

It has been provided a block of transformers (33) performing a suitable galvanic separation, so that any problem in a circuit does not affect the remaining circuits of the module.

The block of the interface with the software processing unit (34) or IDCP, takes on the task of implementing the series interface with the hybrid circuits as an actuating and scanning point, carrying out the parallel/series and series/parallel data conversion.

The information from the software processing unit (24) arrives in this series interface with the hybrid circuits, encoding it in an adequate manner and sending it to the transformer block (33), where the internal clock signal (35) also arrives to synchronizes the actuation of the actuating and scanning integrated circuit—with the commands received.

On its side, the answer signal of the actuating and scanning integrated circuit (27) is sent through the interface with the software processing unit (34) toward the software processing unit.

It is not considered necessary to extend more this description for an expert in the art to understand the scope of the invention and the advantages derived from it.

The materials, shape, size and arrangement of the components are open to variation, provided that it does not imply any alteration to the essence of the invention.

The terms under which this specification has been described should be always taken in an ample and non limitative sense.

I claim:

1. An actuating and dual scanning integrated circuit for simultaneously programmably controlling two power converters located outside the circuit, the circuit comprising:

a) an analog block that receives analog signals;

b) a digital filter means, connected to exchange digital signals with the analog block, for filtering digital representations of the analog signals and for providing digital filtered signals;

c) at least one register means for storing programming received from outside the actuating and dual scanning integrated circuit;

d) first and second programmable power regulators, each of the first and second programmable power regulators including modulator means for transmitting energy transfer commands to respective power converters, the energy transfer commands being based on the programming stored in the at least one register means;

e) means for generating a reset signal and a clock signal for the circuit; and f) an interface for interfacing the analog block, the digital filter, and first and second power regulators to external elements.

2. The circuit of claim 1, wherein:

the modulating means modulates its output signals based on feedback received from output sites located at outputs of the respective power converters.

3. The circuit of claim 1, further comprising:

a control system; and a series communications link connecting the control system and the actuating and dual scanning integrated circuit, whereby the control system varies the programming stored in the at least one register means and whereby the control system receives data indicating performance of the circuit.

4. The circuit of claim 1, wherein the programmable power regulators constitute:

means for controlling voltages and currents generated at respective corresponding output sites.

5. The circuit of claim 1, further comprising:

means for reading voltages and current levels at output sites on which the circuit acts.

* * * * *